United States Patent [19]
Munsey

[11] 3,877,191
[45] Apr. 15, 1975

[54] CONNECTOR ASSEMBLY AND SUPPORT POST

[75] Inventor: Robert J. Munsey, Grand Rapids, Mich.

[73] Assignee: Westinghouse Electric Corporation, Pittsburgh, Pa.

[22] Filed: May 7, 1974

[21] Appl. No.: 467,755

[52] U.S. Cl. .................. 52/632; 52/239; 52;495
[51] Int. Cl. .......................... E04b 2/82; E04c 3/30
[58] Field of Search ............ 52/632, 720, 584, 122, 52/127, 73, 239, 282, 281, 495; 160/351, 135; 248/125; 211/105.3

[56] References Cited
UNITED STATES PATENTS

| | | | |
|---|---|---|---|
| 2,949,984 | 8/1960 | Daniels | 52/632 X |
| 3,083,795 | 4/1963 | Land | 52/632 X |
| 3,324,613 | 6/1967 | Duboff | 52/632 X |
| 3,762,116 | 10/1973 | Anderson et al. | 52/239 |

Primary Examiner—Price C. Faw, Jr.
Attorney, Agent, or Firm—B. R. Studebaker

[57] ABSTRACT

An improved connector assembly and support post for connecting and supporting one or more space dividing panels of a space dividing panel system in which the upper connector element includes a sloped bore which defines in combination with a threaded post cap a converging annular connector hook receiving slot. The lower connector element of the support post is of two part construction with limited relative vertical movement permitted between the two parts to adjust for variations in support poles and space dividing panel dimensions thereby providing a firm and rigid interconnection between the space dividing panels and the support post.

10 Claims, 4 Drawing Figures

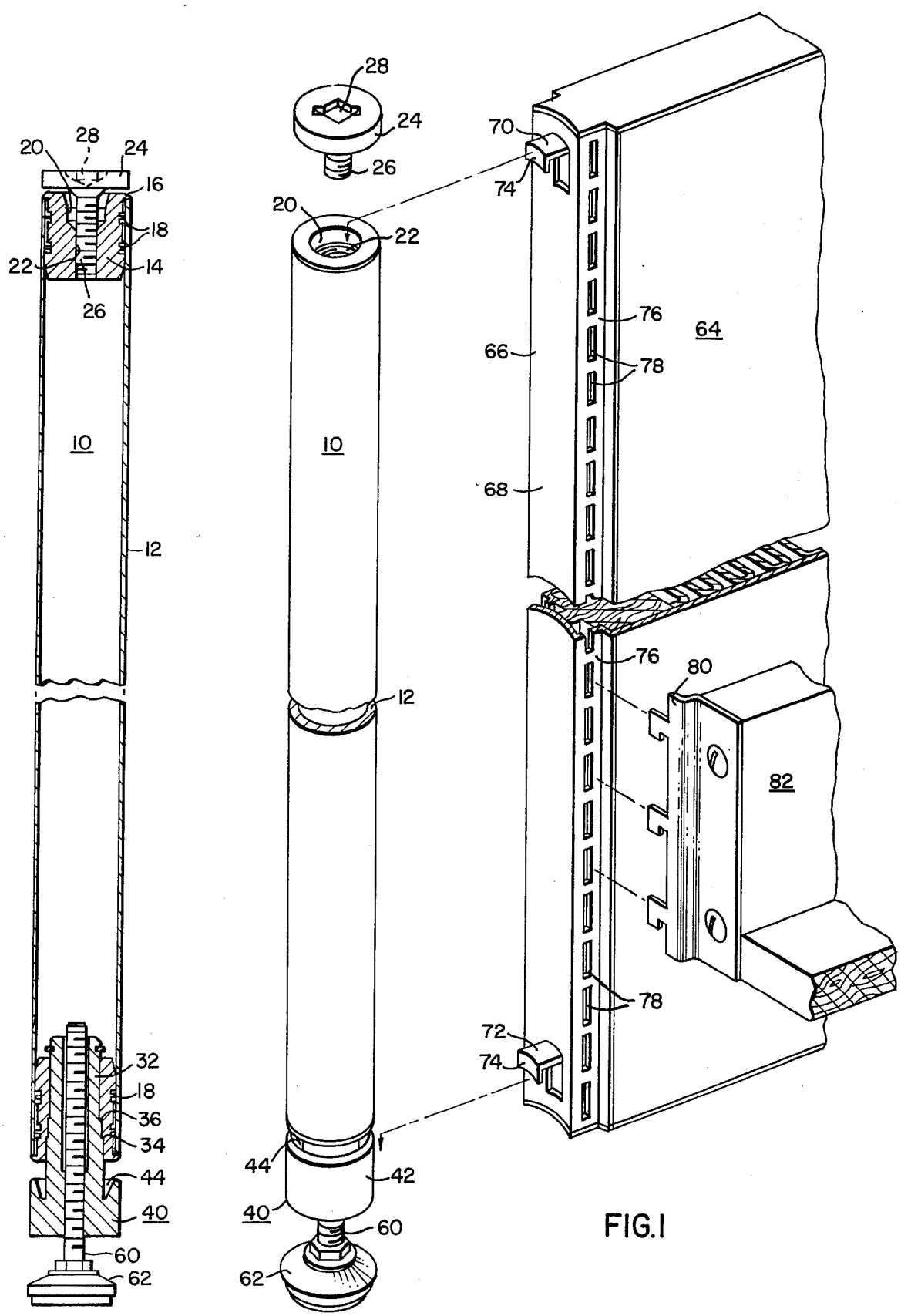

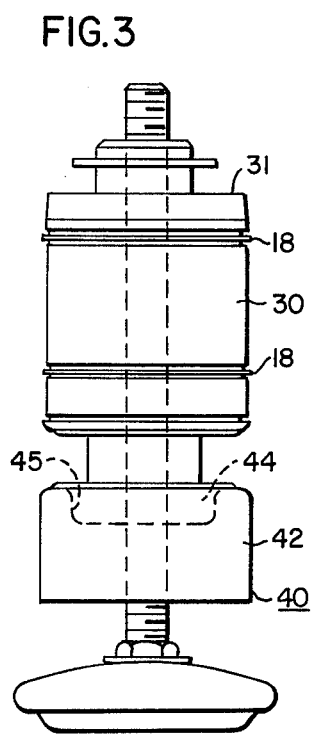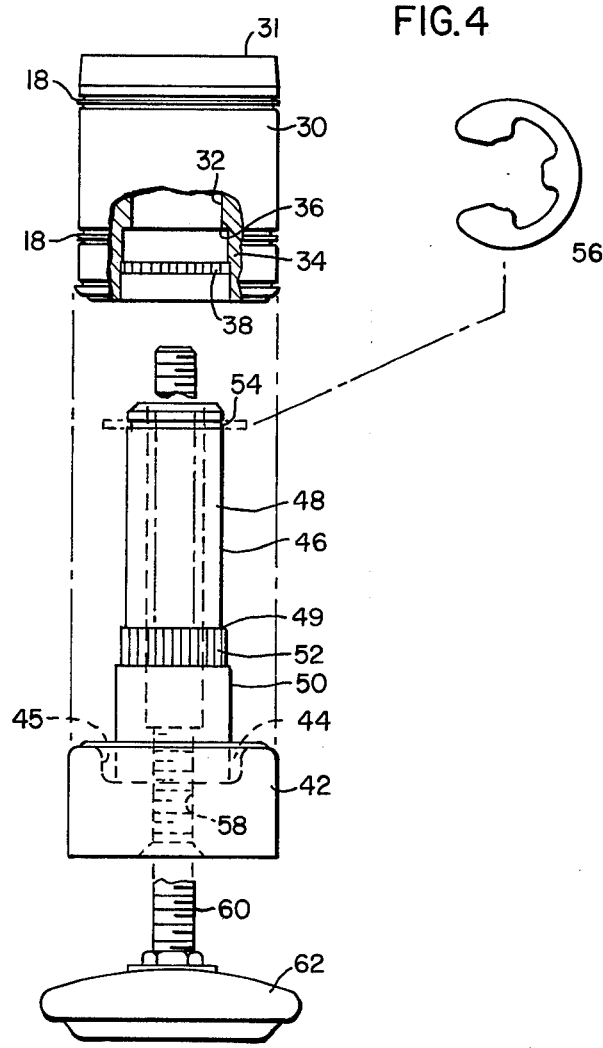

CONNECTOR ASSEMBLY AND SUPPORT POST

BACKGROUND OF THE INVENTION

This invention relates to space dividing systems and more particularly to an improved connector assembly and support post for connecting space dividing panels commonly employed in the modern planning of interior office spaces involving the so-called concept of "office landscaping."

Although the field of "office landscaping" is relatively new, there has been a high level of developmental activity over the recent past few years culminating in a multitude of varied connector assemblies and concepts. For the most part, these prior art systems have left something to be desired from an aesthetic standpoint in that much of the connecting hardware and devices necessary to the assembly of the space dividing system are completely visible thereby detracting from the unitary appearance of the space dividing structure. Furthermore, many of the prior art space dividing systems require numerous different kinds of hardware to assemble the various elements of the space dividing system. An additional, and significant factor in the design of interior space dividing systems is the relative ease of assembly, disassembly and mobility of the units. For example, many systems have adjustable connectors on the support post as well as adjustable connectors on the panels and the relative adjustment of these various connectors require careful, manual, adjustment during assembly to insure aesthetically complementary appearance from the standpoint of symmetry and alignment.

One of the most commercially successful space dividing systems is disclosed in U.S. Pat. No. 3,762,116 which provides a system wherein all of the connecting hardware is substantially hidden from view with the universal connector assemblies on the support post completely hidden within the silhouette of the support post while additionally providing fixed locations for the connectors facilitating quick and simple assembly of the space divider system. Although clearly superior to the majority of space dividing systems the system disclosed in the aforementioned U.S. Pat. evidences minor drawbacks in the post caps ability to grip the connector hooks on the space dividing panels. Additionally, because of significant variations in the pole lengths and the space between the connectors on the panel end bracket due to manufacturing process inconsistencies, some post and panel combinations fit rather loosely. Even slight dimensional inconsistencies between the parts can lead to loose connections in the prior art system.

SUMMARY OF THE INVENTION

The space dividing system and more particularly the improved connector assembly and support post of this invention is similar to and an improvement over the system disclosed in the above-described U.S. Pat. No. 3,762,116. The improvements reside in the post connector elements which act in consort to provide a uniform and firm connection between the post and the space dividing panels. The principal improved features involve the tapered annular slots which improve the gripping connection with the connector hooks of the space dividing panel and the two part construction of the lower connector assembly which permits limited axial adjustment between the two parts of the connector assembly.

The foregoing is accomplished in accordance with the present invention by providing an upper connector assembly in the form of a plug-like connector element fitted within and closing off the top end of the hollow tubular post with this plug-like connector element including an aperture extending axially therethrough which is wider at its upper end portion and tapered at a slight angle inwardly to a narrow threaded bore portion. A threaded cap is received into the narrow threaded bore portion and forms in combination with the tapering upper end potion of the aperture an annular slot for receiving connector hooks of the spacce dividing panels. A lower plug-like connector element is fitted within and closes off the bottom ends of the tubular post and this second plug-like connector element also has a bore extending therethrough which has at least two internal surfaces of differing diameters into which a lower connector member which includes an annular slot in its horizontal surface and an elongated stud forming the core of the annular slot extends. This elongated stud also has two different external diameters and is constructed and arranged to be received in and extend through the bore in the lower plug-like member. Means are included on complementary facing surfaces of the stud and the bore which interact to prevent relative rotational movement between the plug-like member and the lower connector member while permitting limited relative axial movement between the two members.

BRIEF DESCRIPTION OF THE DRAWING

Many of the attendant advantages of the present invention will become more readily apparent and better understood as the following detailed description is considered in connection with the accompanying drawing, in which:

FIG. 1 is a perspective view illustrating the connector assembly and support post of this invention and the connecting edge of a space dividing panel;

FIG. 2 is a sectional view taken along the center line of the connector assembly and support post of FIG. 1;

FIG. 3 is a side elevational view of the bottom connector assembly; and

FIG. 4 is an exploded view of the bottom connector assembly.

DESCRIPTION OF THE PREFERRED EMBODIMENT

Referring now in detail to the drawing wherein like reference characters represent like parts throughout the several views there is illustrated in FIGS. 1 and 2 the connector assembly and support post generally designated 10 for supporting and connecting one or more space dividing panels. The principal constituent of the connector assembly and support post is an elongated, open ended, hollow tubular body member 12 of predetermined length and predetermined external diameter which is adapted for vertical orientation. The tubular body member or central portion of the post 12 is closed off at its upper ends by a plug-like panel connector element 14 which, at its maximum diameter, shoulder 16, coincides with the external diameter of the post 12. A pair of circumferential fins 18 which are of a slightly greater diameter than the main portion of the connector element serve to retain the plug-like member within the tubular post. The upper plug-like panel connector element 14 includes an axial bore or aperture which includes a tapered portion 20 and a threaded portion 22. The tapered portion 20 slopes inwardly at an angle of approximately 12°, the purpose of which will be later described. A post cap 24 including an elongated threaded stud 26 is received into the threaded portion 22 of the upper connector element and includes on its upper surface a combination hex recess and slot 28 which permits the post cap to be tightened with either a hex shape or Alan type tool, screwdriver or coin. As will be apparent the upper portion of the threaded stud in combination with the tapered portion 20 of the bore forms an annular, hook retaining, slot for supporting and retaining the upper hook connector of a space dividing panel.

A second plug-like member 30 having an upper flat surface 31 is fitted within and closes off the bottom end of the tubular post 12 and includes therethrough an axial bore which has at least two internal surfaces of differing diameters 32 and 34 with the intersection of the two differing diameters forming a shoulder or stop 36. The larger diameter portion of the bore 34 carries thereon circumferentially disposed splines or serrations 38 and the plug-like member 30 includes the same raised ribs 18 to grip the inside of the tube 12 and retain the member 30 therein. A lower connector element 40 includes a cylindrical base 42 with an annular slot 44 in the upper horizontal surface thereof and an elongated stud forming the core of the slot and extending for a substantial distance beyond the horizontal surface defined by the top edge of the outer wall of the annular slot. The annular slot 44 has a tapered outer annular wall 45 sloping inwardly from top to bottom, preferably at an angle of approximately 12°. The elongated stud 46 has at least two different external diameters 48 and 50 which corresponds respectively with the internal diameters 32 and 34 of the plug-like member. The intersection of the two different external diameters 48 and 50 forms a shoulder 49 which in connection with the shoulder 36 limits the extent of penetration of the stud 46 into the bore 32, 34. The stud 46 has circumferentially disposed on the portion 50 thereof splines or serrations 52 which are adapted to intermesh with the splines 38 of the plug-like member 30 to prevent rotational motion between the two parts when the stud 46 extends through the bore 32, 34. At the end of the stud 46 remote from the cylindrical base 42 is a circumferential slot 54 which is adapted to receive an E-shaped retaining ring 56.

It will be apparent that any means such as for example a cotter pin could be substituted for E-shaped retaining ring 56 so long as it was removable and prevented withdrawal of the stud 46 from the bore 32, 34 by coacting with the surface 31 of the member 30.

The lower connector member has an aperture extending therethrough which is threaded in the area of the base portion at 58 and which is adapted to receive the threaded stud 60 of the leveler, foot support 62. Alternatively, among other possibilities, a caster may be substituted for the foot support to provide mobility to the system.

The space dividing panels, generally designated 64 include on at least one edge thereof, and preferably on two side edges, an external mounting strip or edge bracket 66 which is secured to the edges of the panel or board 64 by any one of several conventional means. The outer face 68 of the mounting strip or end bracket 66 is preferably somewhat concave as will be apparent from FIG. 1 with a radius of curvature substantially similar to the radius of curvature of the support post 10. Alternatively, any recess in the strip which provides a similar light seal between the post and the panel could accomplish the same result. Formed at the top and bottom of the end bracket are hook connector extensions 70 and 72 which are formed preferably integrally with and directly from the end bracket and terminate in hooked portions 74 which have substantially the same radius of curvature as the annular slots 20 and 44. The side walls 76 of the end brackets include a plurality of notches 78 which serve to mount shelves, desk tops and similar items. For example, the series of notches 78, in the side walls 76 of the end brackets 66 are adapted to receive hooked brackets as illustrated at 80 which may in turn support book shelves, cabinets, desk tops or the like 82 in a manner which is well known in the art.

The improvements in the connector assembly and support post of this invention involve the improved gripping of the connector hooks 70 and 72 provided by the inwardly tapering side walls of the upper aperture at 20 and the annular slot 44. These tapered side walls provide a wedging action in connection with the hook connectors 70 and 72 and eliminate any looseness or rattle which can occur when the hook connectors fit loosely into the annular slots. In addition, slight variations in length of the tubular body 12 with respect to the space between a given pair of hook connectors 70 and 72 which are not, because of limitations of the manufacturing process, always exact are accommodated by the interaction of the plug-like member 30 and the lower connector member 40 which permits limited axial displacement of one member with respect to the other while completely prohibiting any rotational displacement therebetween. The stud 46 essentially rides freely in the bore 32, 34 between a lower stop which is provided by the contact between the shoulder 36, between internal diameters 32 and 34 and shoulder 49 which is defined by the intersection of diameters 48 and 50 of the stud 46. This stop or limit defines the lowermost position or closest proximity that the plug-like member can achieve with respect to the base 42 of lower connector member 40. Upper limitation or maximum displacement of the second plug-like member 30 with respect to the lower connector member base 42 is limited by the contact of the upper surface 31 of the member 30 with the E-shaped retaining ring 56 disposed in the circumferential slot 54. In the preferred embodiment the relative movement of the plug-like member 30 along the shank 46 is limited to approximately 3/16 of an inch which is sufficient to accommodate any deviation in dimensional characteristics of mass produced tubular body members 12 and mounting strip or end brackets 66.

In the preferred embodiment all of the connector elements and support post parts are preferably steel with a plastic coating of 0.004 to 0.006 inches thick which increases the abrasion and impact resistance of the parts in addition to matching the color of all the elements from the bottom to the post cap on the top.

What is claimed is:

1. An improved connector assembly and support post for connecting and supporting one or more space dividing panels of a space dividing panel system, said improved connector assembly and support post comprising:

a hollow tubular body member of predetermined length, a first plug-like connector element fitted within and closing off the top end of said hollow tubular body member, said first plug-like connector element having an aperture extending axially therethrough, said aperture including a wider upper end portion tapering at a slight angle inwardly to a narrower threaded bore portion, a threaded cap including an elongated threaded shank portion constructed and arranged to be received in said narrower threaded bore portion of said first plug-like connector element, said threaded shank and said wider upper end portion of said aperture forming an annular slot, a second plug-like member fitted within and closing off the bottom end of said tubular body member, said second plug-like member having a bore therethrough, said bore having at least two internal surfaces of differing diameters, a lower connector member having an annular slot in a horizontal surface thereof, and an elongated stud forming the core of said slot and extending for a substantial distance beyond the horizontal surface defined by the top edge of the outer wall of said slot, said elongated stud having at least two external surfaces of differing diameters and being constructed and arranged to be received in and extend through said bore in said second plug-like member, means on one of said different external surfaces of said stud and complementary means on at least one of said different internal surfaces of said bore interacting to prevent relative rotational movement between said second plug-like member and said lower connector member, and means on said elongated stud retaining said stud within said bore in said second plug-like member while permitting limited axial movement therebetween.

2. The improved connector assembly and support post as defined in claim 1 wherein said slight tapering angle in said first plug-like connector is approximately 12°.

3. An improved connector assembly and support post according to claim 2 wherein the outer wall of said annular slot in said lower connector member also slopes inwardly at an angle of approximately 12°.

4. An improved connector assembly and support post according to claim 1 wherein means on one of said different external surfaces of said stud and complementary means on at least one of said different internal surfaces of said bore interacting to prevent relative rotational movement therebetween includes splines on the larger diameter bore in said second plug-like member and splines on the larger diameter external surface on said elongated stud.

5. An improved connector assembly and support post for retaining and supporting a space dividing panel system comprising:

a vertically disposed tubular body member;

a first two part connector assembly secured to the upper end of said tubular body member, said two part connector assembly including an aperture extending through one part thereof having an upper tapering portion and a threaded portion, said second part being a threaded bolt receiveable in said aperture and adapted to secure a connector hook from a space dividing panel in said tapered portion of said aperture;

a second two part connector assembly secured to the lower end of said tubular body member, one part of said second two part connector including a bore therethrough having at least two different internal diameters forming a shoulder at their intersection, the other part of said second two part connector including a base portion and an elongated stud portion, said elongated stud portion having at least two different external diameters and extending through said bore, said base portion having an annular slot in the upper side thereof surrounding said elongated stud, said annular slot being constructed and arranged to receive a connector hook from a space dividing panel therein; and means on said stud and said bore restricting relative rotational movement between said parts while permitting limited axial movement therebetween.

6. The improved connector assembly and support post according to claim 5 wherein the upper tapering portion of said one part and the outer wall of the annular slot in the other part of said second two part connector slop inwardly at an angle of approximately 12°.

7. The improved connector assembly and support post according to claim 5 wherein said means on said stud and said bore means on said stud and said bore restricting relative rotational movement between the parts while permitting limited axial movement therebetween includes circumferentially disposed intermeshing splines on each of said stud and said bore and resilient clip means associated with the end of said stud remote from said base portion.

8. A length adjusting post bottom adaptor for space dividing panel systems comprising:

a first member adapted to be forcibly fit into the bottom end of a panel supporting post, a bore extending through said first member having at least two different diameters defining a shoulder at their intersection;

a second member constructed and arranged to be received in part in said bore having a base portion and a shank portion extending centrally therefrom and an annular recess in said base portion surrounding said shank portion, said shank portion having at least two different external diameters defining a shoulder at their intersection, said shank portion being of greater length than said bore in said first member and, means on said shank portion and said bore cooperating to permit limited axial movement between said first and second members while restricting rotational movement therebetween.

9. A length adjusting post bottom adaptor for space dividing panel systems according to claim 8 wherein said shank portion includes a circumferential slot therein adjacent the end thereof remote from said base portion, and resilient clip means is releasably retained in said slot forming a stop and preventing withdraw of said shank portion from said bore.

10. A length adjusting post bottom adaptor for space dividing panel systems according to claim 8 wherein a plurality of serrations on the larger diameter of said shank portion intermesh with a plurality of serrations on the larger diameter of said bore to thereby restrict relative rotational movement between said first and second members.

* * * * *